US010179859B2

(12) United States Patent
Diehl et al.

(10) Patent No.: US 10,179,859 B2
(45) Date of Patent: Jan. 15, 2019

(54) PELLETED ACETYLENE BLACK

(71) Applicant: ORION ENGINEERED CARBONS GMBH, Frankfurt am Main (DE)

(72) Inventors: Florian Diehl, Neuss (DE); Werner Niedermeier, Brühl (DE); Silke Teike, Elsdorf (DE); Helmut Kriesch, Mechernich (DE)

(73) Assignee: ORION ENGINEERED CARBONS GMBH, Frankfurt am Main (DE)

( * ) Notice: Subject to any disclaimer, the term of this patent is extended or adjusted under 35 U.S.C. 154(b) by 0 days.

(21) Appl. No.: 15/121,840

(22) PCT Filed: Feb. 23, 2015

(86) PCT No.: PCT/EP2015/053701
§ 371 (c)(1),
(2) Date: Aug. 26, 2016

(87) PCT Pub. No.: WO2015/128278
PCT Pub. Date: Sep. 3, 2015

(65) Prior Publication Data
US 2017/0015831 A1 Jan. 19, 2017

(30) Foreign Application Priority Data

Feb. 28, 2014 (EP) ..................................... 14157126

(51) Int. Cl.
*H01B 1/24* (2006.01)
*C09C 1/54* (2006.01)
*C09C 1/58* (2006.01)
*C08K 3/04* (2006.01)

(52) U.S. Cl.
CPC ................. *C09C 1/54* (2013.01); *C08K 3/04* (2013.01); *C09C 1/58* (2013.01); *H01B 1/24* (2013.01); *C01P 2004/51* (2013.01); *C01P 2004/60* (2013.01); *C01P 2004/61* (2013.01); *C01P 2006/12* (2013.01); *C01P 2006/19* (2013.01); *C01P 2006/21* (2013.01); *C01P 2006/40* (2013.01); *C08K 2201/001* (2013.01); *C08K 2201/005* (2013.01); *C08K 2201/017* (2013.01)

(58) Field of Classification Search
CPC ... H01B 1/24; H01B 1/20; H01B 1/08; H01B 1/22; C09C 1/54; C09C 1/58; C01P 2004/51; C01P 2004/60; C01P 2004/61; C01P 2006/12; C01P 2006/19; C01P 2006/21; C01P 2006/40; C08K 2201/001; C08K 2201/005; C08K 2201/017; C08K 3/04; C09D 17/005
See application file for complete search history.

(56) References Cited

U.S. PATENT DOCUMENTS

| 2,475,282 | A | 7/1949 | Hasche |
| 4,608,244 | A * | 8/1986 | Sugihara .................. C09C 1/54 |
| | | | 423/449.1 |
| 6,132,876 | A | 10/2000 | Vogler et al. |
| 6,231,624 | B1 * | 5/2001 | Vogler ....................... C09C 1/60 |
| | | | 23/314 |
| 6,482,386 | B2 | 11/2002 | Atchetee et al. |
| 6,512,987 | B1 | 1/2003 | Pattern |
| 7,172,652 | B2 | 2/2007 | Zoch et al. |
| 8,394,190 | B2 | 3/2013 | Bertzick et al. |
| 9,062,175 | B2 | 6/2015 | Brigandi |
| 2004/0219363 | A1 | 11/2004 | Schuch et al. |
| 2007/0203284 | A1 | 8/2007 | Schuch et al. |
| 2018/0128414 | A1 | 5/2018 | Hampson |

FOREIGN PATENT DOCUMENTS

| DE | 3512479 | A1 | 10/1985 |
| DE | 19623198 | A1 | 12/1997 |
| DE | 10350188 | | 6/2005 |
| EP | 0785239 | A1 | 7/1997 |
| EP | 0924268 | A2 | 6/1999 |
| EP | 1293543 | A1 | 3/2003 |
| EP | 1464681 | A2 | 10/2004 |
| EP | 2075291 | A1 | 7/2009 |
| JP | S56-90860 | U | 7/1981 |
| JP | H10-060301 | A | 3/1998 |
| JP | 2003-528305 | A | 9/2003 |
| JP | 2004-510836 | A | 4/2004 |
| JP | 2004-269887 | A | 9/2004 |
| JP | 3681253 | B2 | 8/2005 |
| JP | 3681266 | B2 | 8/2005 |

(Continued)

OTHER PUBLICATIONS

ASTM D1937-05, Standard Test Method for Carbon Black, Pelleted—Mass Strength, ASTM International, West Conshohocken, PA, 2005, pp. 1-3.
ASTM D1510-06a, Standard Test Method for Carbon Black-Iodine Adsorption Number, ASTM International, West Conshohocken, PA, 2006, pp. 1-8.
ASTM D2414-09a, Standard Test Method for Carbon Black—Oil Absorption Number (OAN), ASTM International, West Conshohocken, PA, 2009, pp. 1-7.
ASTM D1513-05, Standard Test Method for Carbon Black, Pelleted—Pour Density, ASTM International, West Conshohocken, PA, 2005, pp. 1-3.

(Continued)

*Primary Examiner* — Mark Kopec
*Assistant Examiner* — Jaison P Thomas
(74) *Attorney, Agent, or Firm* — Smith, Gambrell & Russell, LLP

(57) ABSTRACT

The present invention relates to a pelleted acetylene black having a mass strength measured according to ASTM D 1937-10 of 200 N at most and an average pellet size measured according to ASTM D 1511-10 of at least 1.0 mm, to the use of any of said pelleted acetylene blacks to produce a compound comprising a resin or polymer or rubber matrix and the acetylene black dispersed in said matrix and to a method for producing such a compound.

19 Claims, No Drawings

(56) References Cited

FOREIGN PATENT DOCUMENTS

| | | |
|---|---|---|
| JP | 2007-137980 A | 6/2007 |
| JP | 2009-035598 A | 2/2009 |
| JP | 2010-031214 A | 2/2010 |
| JP | 2010-535864 A | 11/2010 |
| JP | 2012-508315 A | 4/2012 |
| JP | 2013-540172 A | 10/2013 |

OTHER PUBLICATIONS

ASTM D1508-02 (2007), Standard Test Method for Carbon Black, Pelleted Fines and Attrition, ASTM International, West Conshohocken, PA, 2007, pp. 1-3.

ASTM D3313-99, Standard Test Method for Carbon Black-Individual Pellet Hardness, ASTM International, West Conshohocken, PA, 1999, pp. 1-3.

DIN EN 13900-5, Pigments and Extenders—Methods of Dispersion and Assessment of Dispersibility in Plastics—Part 5: Determination by Filter Pressure Value Test, Jul. 2005.

DIN EN 13900-6, Pigments and extenders—Methods of dispersion and assessment of dispersability in plastics—Part 6: Determination by film test, FprEN 13900-6 as agreed in Vienna Sep. 20, 2011 (clean version), ISO/TC 256/WG 5 N 29, date of document Dec. 14, 2011, pp. 1-13.

International Preliminary Report on Patentability dated Sep. 9, 2016 in International Application No. PCT/EP2015/053701 (5 pages).

ASTM D1511-10, Standard Test Method for Carbon Black—Pellet Size Distribution, ASTM International, West Conshohocken, PA, 2010, pp. 1-4.

JIS (Japan Industrial Standards) K1469: 2003. For Acetylene Black: Acetylene Black for Batteries. 2003 (Japanese with English machine translation—28 pages).

International Search Report for PCT/EP2015/053701, dated Mar. 26, 2015 in English Language.

International Written Opinion for PCT/EP2015/053701, dated Mar. 26, 205 in English Language.

J. Dongliang et al., Inorganic Non-Metallic Material Manual II, Chemical Industry Press, pp. 479, Jul. 2009 (3 pages).

Chinese Office Action mailed relative to Chinese patent application 201580011224.5, dated Oct. 19, 2017 (4 pages), with English translation (6 pages).

Japanese Office Action dated Oct. 16, 2018 for JP Patent Application No. 2016-554361 (7 pages in Japanese, and English translation).

\* cited by examiner

PELLETED ACETYLENE BLACK

The present invention relates to pelleted acetylene blacks and their use.

BACKGROUND OF THE INVENTION

Acetylene blacks are inter alia used as electrically conductive agents in a polymeric matrix. Acetylene blacks are obtained in production in form of fine powders and are therefore in general pelleted for ease of handling and shipping. Thus, one requirement of acetylene black pellets is that they are sufficiently mechanically stable to withstand breakup and attrition of the pellets during handling and shipping resulting in undesired fines. On the other hand it is important for the end users that the acetylene black pellets can be easily and homogeneously dispersed in the polymeric matrix without formation of large agglomerates of acetylene black resulting in undesired defect areas in the final product. Thus, the mechanical strength of acetylene black pellets cannot be increased to an extent that would jeopardize the dispersion quality of the acetylene black in the polymeric matrix of the final product. These two important requirements for acetylene black are difficult to achieve simultaneously and consequently there have been numerous attempts in the industry in the past to produce acetylene black pellets that at the same time withstand substantially break-up and attrition during handling and shipping and still can be easily dispersed in the polymeric matrix resulting in a homogeneous distribution of the carbon black in the matrix with a minimum of defect areas.

In DE 35 12 479 the problem of the above discussed balance of properties of pelleted acetylene black is discussed and it is proposed to provide acetylene black pellets having an individual pellet hardness of less than 5 g per pellet to ensure the required dispersibility of the acetylene black pellets in the polymeric matrix. Although it is indicated in this reference that the size of the acetylene black pellets can be varied in a broad range of 0.5 to 5 mm, it is evident from the experimental data when comparing two size fractions of the acetylene black material that the dispersibility of the size fraction of 2 to 3.2 mm is considerably deteriorated compared to the size fraction of 0.1 to 2 mm. This is clearly shown by the reduction of the impact strength of the polymeric material including the acetylene black and the considerable increase of the number of large aggregate per defined area. Thus it is evident from DE 35 12 479 for a person skilled in the art that large pellet sizes are to avoided if good dispersibility of the acetylene black in the polymeric matrix is required.

According to EP A 785 239 filed by the same applicant as DE 35 12 479 the problem of mechanical stability and dispersibility of acetylene black pellets is discussed. According to the teaching of that reference it is important in contradiction to DE 35 12 479 that the individual pellet strength is more than 5 g per pellet in order to avoid fine formation from handling and to improve the dispersibility of the acetylene black in the polymeric matrix. According to the teaching of EP A 785 239 this can be achieved by a two-step pelletizing process wherein a soft core of acetylene black is coated with a hard acetylene black shell resulting in a core/shell structure. As it is particularly evident from comparing comparative example 4 of this reference with example 3 that differ only in that in comparative example 4 the second process step resulting in the hard shell has been omitted, not only the content of fines has been increased considerably compared to example 3 what would have been expected, but also the dispersibility of the softer core material is reduced compared to the core/shell material as is shown by the increase of volume resistivity.

A similar concept of core/shell pellets was proposed in JP 3681253 and JP 3681266.

Although these references show that the formation of core/shell pellets may lead to an improved balance of mechanical strength and dispersibility of acetylene black pellets this technology has the disadvantage that the production process is rather complicated with increased energy consumption, investment and production costs versus a one-step process. Thus, it still would be desirable to obtain acetylene black pellets without the necessity of core/shell structures and thus a two-step process but still having an optimum balance of mechanical strength and dispersibility.

Another approach to form non-core/shell pellets was proposed in EP A 2 075 291. According to the teaching of this reference it is essential to select granulated acetylene black to have an average aspect ratio of at most 1.1, an average maximum pellet size from 0.1 mm to 1 mm and an average pellet size of from 0.2 to 0.6 mm. Thus, EPA 2 075 291 confirms the conclusion from DE 35 12 479 that individual pellet strength is a function of pellet size and increases with pellet size with the result that pellet size of the pellets should be low, i.e. within the range of 0.2 to 0.6 mm in order to achieve the required dispersibility. Particularly from comparative example 7 in EP 2 075 291 having an average pellet size of 0.75 mm, but still the required aspect ratio the individual pellet hardness is increased to a value of 5.5 g per pellet, thus above the limit as taught in DE 35 12 479. This results in a reduction of pulverization but also in an increase of volume resistivity and number of hard spots indicating a considerably reduced dispersibility.

Furthermore, pelleted acetylene black products are on market for example the product Denka Black Grade Granular available from DENKI KAGAKU KOGYO KABUSHIKI KAISHA, Japan. The properties of this commercial product are shown in the experimental part of present application. Particularly this product has an average pellet size of 0.7 mm.

As evident from the discussion of the prior art there is still a need in the industry to have pelleted acetylene black material exhibiting an optimum balance of attrition stability and dispersibility in polymeric matrices that can be produced in a cost-effective process. Furthermore for the end-users of these acetylene black pellets it would be advantageous if not only the required dispersibility is provided but also the energy required for dispersing the acetylene black pellets can be reduced.

Thus, it is an object of the present invention to provide pelleted acetylene blacks that lead to a reduction of the energy required for dispersing the acetylene black in polymeric matrices without compromising handling properties and dispersibility. According to a further preferred aspect of the present invention it is advantageous if the dispersibility is further improved.

SUMMARY OF THE INVENTION

The above problem has been surprisingly solved by a pelleted acetylene black having a mass strength measured according to ASTM D 1937-10 of 200 N at most and an average pellet size measured according to ASTM D 1511-10 of at least 1.0 mm.

The pelleted acetylene black according to the present invention can be obtained in a cost-efficient single step pelletizing process without the necessity of using any organic binders. Thus it is preferred that the pellets of the pelleted acetylene black according to the present invention do not have a core/shell morphology. Furthermore, preferably the pellets do not contain an organic binder.

According to a preferred embodiment of the present invention the average pellet size of the pelleted acetylene black measured according to ASTM D 1511-10 is at least 1.4 mm.

DETAILED DESCRIPTION

As starting material for making the pelletized acetylene black according to the present invention acetylene black powder can be obtained by maintaining the temperature of pyrolysis of acetylene gas at a level of at least 1.500° C., preferably at least 2.000° C. Pyrolytic furnaces to manufacture acetylene black are well known in the prior art as for example disclosed in JP A 56-90860 or U.S. Pat. No. 2,475,282. It is additionally possible to control the temperature of pyrolysis by introducing hydrogen gas as inert gas or other inert gases during the pyrolysis of acetylene gas. Acetylene black powder that can be used as starting material for the pelleted acetylene black according to the present invention is also obtainable from commercial sources. Suitable acetylene black powder starting materials can have the following properties:

Iodine absorption numbers measured according to ASTM D 1510-11 method in the range of 50-150 mg/g,
OAN measured according to ASTM D 2414-09A using paraffin oil and a procedure B in the range of 150-350 ml/100 g,
Bulk density measured with the method according to ASTM 1513-05 in the range of 50-150 g/l.

The pulverized acetylene black starting material can be pelletized using a one-step wet pelletize system without organic binders as for example described in EP-A 0 924 268 or DE-A 103 50 188 whereby agitation granulation systems like a ring layer mixer granulator can be used. In this one-step pelletizing process the rotational speed of the granulator as well as the mass flow of pulverized acetylene black starting material and water can be adjusted to obtain the required mass strengths and pellet size. The selection of the specific parameters will also depend on the pulverulent starting material, particularly its bulk density.

Subsequently, the obtained pellets are dried whereby preferably rotational drum dryers can be used. Since the properties of the pelleted acetylene black will depend on the type of the pulverized starting material as well as several parameters of the pelletizing process some trial and error experiments are necessary to appropriately adjust the pelletizing parameters depending on the starting material used.

As a rule of thumb:
at constant water-to-powder weight ratio, increasing rotational speed of the granulator will lead to smaller pellets with higher mass strength,
at constant rotational speed of the granulator, an increased water-to-powder weight ratio will shift the pellet size distribution to larger pellets with higher mass strength.

The specific working examples as shown in the experimental part of the present application will provide to a person skilled in the art some guidance how to adjust the process parameters to obtain pelleted acetylene black according to the present invention.

Furthermore, to adjust the appropriate average pellet size the obtained dried acetylene black pellets can be size fractionated using standard methods like sieve classification and then the appropriate size fraction can be selected to fulfill the pellet size criteria of the present invention.

The mass strengths measured according to ASTM D1937-10 of the pelleted acetylene black according to the present invention can be in the range of 20 to 200 N, preferably 40 to 200 N, more preferred 60 to 200 N and most preferred 70 to 190 N.

The average pellet size measured according to ASTM D1511-10 of the pelleted acetylene black according to the present invention can be in the range of 1.0 to 2.5 mm, preferably 1.2 to 2.5 mm, more preferred 1.4 to 2.5 mm and most preferred 1.4 to 2.0 mm.

It has been surprisingly discovered that if the average pellet size is above 1.4 mm not only the dispersing energy can be reduced, but also the dispersion quality compared to the above-cited commercially available pelleted acetylene black from Denka can be further improved. Thus, it is also beneficial according to a preferred embodiment of the present invention if the proportion of pellets of the pelleted acetylene black according to the present invention having a size of at least 1.4 mm measured according to ASTM D1511-10 is increased. It is preferred if at least 40 weight percent of the pellets of the pelleted acetylene black according to the present invention have a size of at least 1.4 mm measured according to ASTM D1511-10. Particularly at least 35 weight percent of the pellets of the pelleted acetylene black according to the present invention have a size within the range of 1.4 mm to 2.0 mm. It is particularly preferred if at least 40 weight percent of the pellets have a size within the range of 1.4 mm to 2.0 mm.

It is evident from the above-cited prior art references, particularly DE 35 12 479 and EP 2 075 291 that the individual pellet strength is dependent on the pellet size whereby with increasing pellet size the individual pellet strength increases. Thus, a parameter suitable to describe the mechanical stability of the entire sample of a pelleted carbon black independent of the pellet size is the average compressive strength. Measurement and calculation of the average compressive strength is described in more detail in the experimental part of the present application.

According to the present invention it is preferred if the average compressive strength is less than 65 kPa, preferably 15 to 60 kPa, more preferred 20 to 55 kPa, and most preferred 25 to 50 kPa.

As described above, the advantage of the pelleted acetylene black according to the present invention is that upon dispersion in a polymeric matrix the mixing energy necessary for homogeneous dispersion can be considerably reduced and in some preferred embodiments according to the present invention the dispersion quality can be further increased.

Thus, the pelleted acetylene black according to the present invention can be advantageously used for producing compounds comprising a polymeric matrix having the acetylene black dispersed therein. As compound matrices particularly organic resins, polymers and rubbers can be used.

Suitable resins and polymers according to the present invention may be selected from olefinic polymers such as polypropylene, polyethylene, ethylene-vinyl acetate copolymer, an ethylene-vinyl alcohol resin, polymethyl pentene or a cyclic olefin copolymer, a vinyl chloride type polymer, such as polyvinyl chloride or an ethylene vinyl chloride copolymer, a styrene type polymer, such as polystyrene, a styrene-acrylonitrile copolymer or a acrylonitrile-butadiene-styrene copolymer, an acrylic polymer, such as polymethyl methacrylate, a polyester, such as polyethylene terephthalate, polybutylene terephthalate, a polyamide, a polyacetale, a polycarbonate, polyphenylene ethers, fluoro polymers, such as polytetrafluoroethylene or polyvinylidine fluoride, polyphenyline sulfide, liquid crystal polymers, thermoplastic polyamides, ketone type resins, sulfonic resins, phenyl resins, urea resins, melamine resins, alkyd resins, silicone resins, epoxy resins, urethane resins, polyvinyl ester, polyimide, furan resin, quinine resin, and polymer alloys. Polystyrene polymers, polyethylene polymers and copolymers like ethylene-vinyl-acetate and polypropylene polymers and copolymers are particularly preferred.

Suitable rubbers might be selected from natural rubber, styrene butadiene rubber, acrylonite butadiene rubber, butyl rubber, acryl rubber, ethylene-propylene rubber, ethylene-propylene terpolymer, ethylene-α-olefin copolymer rubber, silicone rubber, fluoro rubber, chloroprene rubber, polybutadiene rubber, hydrin rubber, and chlorosulfonated polyethylene rubber.

The pelleted acetylene black according to the present invention can be compounded and dispersed in the above-described resin, polymer or rubber matrices using standard mixer and blenders and also might be heated to ease homogeneous dispersion if permitted dependent on the selection of resin, polymer or rubber system, whereby blenders, mixers, kneaders or single-screw or twin-screw extruders as known to a person skilled in the art can be employed. Samples of suitable mixing ratios can be 5 to 150 parts by weight of pelleted acetylene black according to the present invention, preferably 10 to 100 parts by weight, based on 100 parts by weight of the resin, polymer or rubber.

Thus, the present invention also relates to a process for the preparation of a compound comprising a resin, polymer or rubber and the pelleted carbon black according to the present invention comprising dispersing the pelleted acetylene black according to the present invention in a resin, polymer or rubber.

The pelleted acetylene black of the present invention thereby functions in the polymer or rubber to impart electrical conductivity. Thus, the pelleted acetylene carbon black of the present invention can also be used as an electrical conductive agent for a battery, such as a primary battery, secondary battery, a fuel battery or a compensator. It can also be used as an antistatic agent or as an electrical conductive agent for electrical conductive paper. The pelleted acetylene black according to the present invention is particularly suitable for the production of semi-conductive shields for wire and cable applications. Furthermore, the pelleted acetylene black of the present invention can be used to impart thermal conductivity in polymer and rubber compounds like in bladders for the production of tires. It can also be advantageously used in coating applications.

The present invention will now be described in more in detail in the following examples.

Particularly the measuring methods for the specific acetylene black properties as described above as well as defined in the claims are measured as given below in the experimental part.

Measuring Methods:

Iodine Adsorption Number: measured according to ASTM D1510-11, method A.

OAN Number: measured according to D2414-09A in paraffin oil, procedure B.

Ash Content: measured according to JIS K1469.

Bulk Density: measured according to ASTM D1513-05.

Pelleted Fines: measured according to ASTM D1508-02.

Mass Strength: measured according to ASTM D1937-10.

Pellet Size Distribution: measured according to ASTM D1511-10.

Specifically nine different sieves with mesh openings of 0.1 to 3.0 mm, 0.25 mm, 0.50 mm, 0.7 mm, 1.0 mm, 1.4 mm, 1.7 mm, 2.0 mm and 3.0 mm are used. The size of each fraction is reported in weight percent.

Average Pellet Size (AVP):

The average pellet size is obtained by multiplying the proportion (P) for each size fraction with the corresponding mesh average (upper sieve mesh opening minus lower sieve mesh opening/2) and adding up all contributions:

$$AVP = 0.0625 \text{ mm} \times P_{0-0.125} + 0.1875 \text{ mm} \times P_{0.125-0.25} + 0.375 \text{ mm} \times P_{0.25-0.50} + 0.60 \text{ mm} \times P_{0.50-0.70} + 0.85 \text{ mm} \times P_{0.70-1.0} + 1.2 \text{ mm} \times P_{1.0-1.4} + 1.55 \text{ mm} \times P_{1.4-1.7} + 1.85 \text{ mm} \times P_{1.7-2.0} + 2.5 \text{ mm} \times P_{2.0-3.0}.$$

Compressive Strength (CS):

The compressive strength of individual carbon black pellets was determined by a method based on ASTM D3313 using a manually operable pellet hardness tester GFP from etewe GmbH in Karlsruhe, Germany. The pellet breakdown is reflected by a sharp maximum in the recorded force deformation diagram which equals the crushing strength $F_B$. The compressive strength was determined for size fractions 0.25 to 0.50 mm, 0.50 to 0.70 mm, 0.70 to 1.0 mm, 1.0 to 1.4 mm, 1.4 to 1.7 mm, 1.7 to 2.0 mm and 2.0 to 3.0 mm. The compressive strength of pellets smaller than 0.25 mm could not be determined due to the low proportion of theses size fractions and their low pellet hardness resulting from their small size.

The compressive strength (=maximum stress a pellet can be withstand under crush loading, measured in Pascal [Pa]) of each pellet is calculated by the etewe software GFPWIN using the following relation:

$$CS = \frac{F_B}{\frac{\pi}{4} \cdot d_0^2}$$

$F_B$: crushing strength $d_0$: individual pellet diameter at the beginning

It reflects the resistance of a pellet against external pressure force. The pellet breakdown occurs if the effective pressure is larger than the compressive strength.

In total, 20 pellets were measured for each size fraction. Reported are the corresponding average values.

Average Compressive Strength (AVCS):

The average compressive strength takes into account the proportion of each pelletized fraction and reflects the mean value of the sample:

$$AVCS = CS_{0.25-0.50} \times P_{0.25-0.50} + CS_{0.50-0.70} \times P_{0.50-0.70} + CS_{0.70-1.0} \times P_{0.70-1.0} + CS_{1.0-1.4} \times P_{1.0-1.4} + CS_{1.4-1.7} \times P_{1.4-1.7} + CS_{1.7-2.0} \times P_{1.7-2.0} + CS_{2.0-3.0} \times P_{2.0-3.0}$$

$CS_i$ is the compressive strength of the specific size fraction and $P_i$ is the proportion of the size fraction in weight percent obtained according to ASTM D1511-10.

EXAMPLES

The following starting acetylene powders were used for the preparation of the pelleted acetylene blacks according to the present invention. The properties of the starting material and the commercial source are given in table 1 below:

TABLE 1

Acetylene black starting material

| Powder Analytics | | ACB 1 | ACB 2 | ACB 3 | ACB 4 | ACB 5 |
|---|---|---|---|---|---|---|
| Commercial Source | SN2A* | Y50A | Y200 | Y160 | Y200 | Y200 |
| Iodine Adsorption | mg/g | 83 | 86 | 113 | 89 | 93 |
| OAN | ml/100 g | 324 | 210 | 271 | 177 | 187 |
| Ash Content | % | 0.01 | 0.01 | 0.00 | 0.01 | 0.01 |
| Bulk Density | g/l | 80 | 116 | 69 | 101 | 128 |

*Société du Noir d'Acétylène de l'Aubette, BP98, 13133 Berre l'Etang cedex, France Preparation of the Pelleted Acetylene Blacks:

For the pelletization a heated ring layer mixer granulator RMG 30 (length: 1180 mm, diameter: 224 mm,), available from Ruberg-Mischtechnik GmbH & Co (Paderborn, Germany), is used. The rotating mixer shaft has a diameter of 95 mm and is equipped with pins arranged in two helices. The RMG 30 is arranged horizontally without inclination. The starting material is continuously fed by a gravimetric feeding device into the granulator. Demineralized water is continuously injected through a pressurized spray nozzle (Type: Schlick, full cone, 1.1 mm) which is placed at the first injection position (A1), 125 mm apart from the centre of the feed port for the acetylene black feed. The pelletizing conditions are summarized in table 2 below:

TABLE 2

Conditions for pelletizing the acetylene black

| | | Comp. Ex. 1 | Ex. 1 | Ex. 2 | Ex. 3 | Ex. 4 |
|---|---|---|---|---|---|---|
| Starting material | | ACB 1 | ACB 2 | ACB 3 | ACB 4 | ACB 5 |
| Revolutions | rpm | 750 | 400 | 500 | 550 | 550 |
| Temperature RMG | ° C. | 100 | 100 | 100 | 100 | 100 |
| Powder mass flow | kg/h | 15 | 13 | 15 | 20 | 20 |
| Water mass flow | kg/h | 30 | 26 | 42 | 37 | 35 |
| Water temperature | ° C. | 70 | 70 | 70 | 70 | 70 |
| Moisture content | % | — | 63 | 70 | 60 | 57 |

Thereafter the pelleted acetylene blacks are dried in a rotary dryer. The specific conditions are summarized in table 3:

TABLE 3

Drying

| Drying | | Comp. Ex. 1 | Ex. 1 | Ex. 2 | Ex. 3 | Ex. 4 |
|---|---|---|---|---|---|---|
| Dryer | | RD | PT200 | RD | RD | RD |
| Revolutions | upm | 5 | 5 | 5 | 5 | 4 |
| Temperature in the acetylene black bed | ° C. | 80 | 100 | 80 | 80 | 80 |
| Drying time | h | 24 | 8 | 25 | 18 | 18 |
| Amount | kg | 60 | 10 | 35 | 35 | 30 |

RD = Rotary Dryer - drum diameter = 0.9 m, drum length = 4 m, and a wall temperature of 120° C.
PT200 = drum diameter = 0.8 m, drum length = 0.4 m, and a wall temperature of 180° C., available from Ruberg-Mischtechnik GmbH & Co (Paderborn, Germany).

The properties for the obtained pelleted acetylene black are summarized in tables 4 to 6. Comparative example 2 is the commercial product obtained from Denka "Denka Black Grade Granular".

TABLE 4

Carbon Black Characterization

| Pellet Analytics | | Comp. Ex. 1 | Ex. 1 | Ex. 2 | Ex. 3 | Ex. 4 | Comp. Ex. 2 |
|---|---|---|---|---|---|---|---|
| Iodine Adsorption | mg/g | 82 | 84 | 87 | 89 | 92 | 87 |
| OAN | ml/100 g | 192 | 188 | 280 | 164 | 172 | 190 |
| Ash Content | % | 0.01 | 0.01 | 0.01 | 0.00 | 0.01 | 0.00 |
| Bulk Density | g/l | 247 | 260 | 205 | 289 | 248 | 265 |
| Pelleted Fines | % | 0.2 | 2.0 | 6.4 | 4.7 | 5.6 | 5.2 |
| Mass Strength | N | 324 | 118 | 114 | 181 | 107 | 110 |
| Average Pellet Size | mm | 1.2 | 1.4 | 1.8 | 1.4 | 1.4 | 0.7 |
| Average Compressive Strength | Pa | 66000 | 48300 | 36000 | 48800 | 27900 | 74800 |

TABLE 5

Pellet Size Distribution

| | | Proportion/wt % | | | | | |
|---|---|---|---|---|---|---|---|
| Pellet Size | | Comp. Ex. 1 | Ex. 1 | Ex. 2 | Ex. 3 | Ex. 4 | Comp. Ex. 2 |
| 0-0.125 | mm | 0.1 | 0.4 | 2.3 | 0.3 | 0.7 | 2.9 |
| 0.125-0.25 | mm | 0.6 | 1.2 | 3.9 | 1.5 | 2.5 | 5.7 |
| 0.25-0.50 | mm | 2.2 | 6.1 | 5.5 | 2.6 | 2.8 | 15.6 |
| 0.50-0.70 | mm | 4.2 | 6.3 | 3.4 | 2.5 | 5.5 | 22.7 |
| 0.70-1.0 | mm | 22.9 | 8.8 | 4.5 | 10.3 | 7.4 | 38.9 |
| 1.0-1.4 | mm | 39.7 | 18.8 | 6.7 | 30.1 | 32.6 | 11.6 |
| 1.4-1.7 | mm | 23.0 | 27.0 | 12.0 | 26.9 | 27.5 | 1.7 |
| 1.7-2.0 | mm | 6.8 | 20.9 | 23.9 | 16.6 | 15.9 | 0.3 |
| 2.0-3.0 | mm | 0.9 | 10.6 | 38.1 | 9.4 | 5.3 | 0.4 |

TABLE 6

Compressive Strength as Function of Pellet Size

| Pellet Size | | Compressive Strength/Pa | | | | | |
|---|---|---|---|---|---|---|---|
| | | Comp. Ex. 1 | Ex. 1 | Ex. 2 | Ex. 3 | Ex. 4 | Comp. Ex. 2 |
| 0.25-0.50 | mm | 148500 | 83900 | 105200 | 162900 | 68900 | 101700 |
| 0.50-0.70 | mm | 89600 | 65700 | 86500 | 93000 | 46700 | 76400 |
| 0.70-1.0 | mm | 79100 | 59600 | 73800 | 63300 | 32900 | 79100 |
| 1.0-1.4 | mm | 63700 | 47400 | 45400 | 51400 | 27500 | 81400 |
| 1.4-1.7 | mm | 51000 | 49100 | 31600 | 43300 | 22900 | 73400 |
| 1.7-2.0 | mm | 52700 | 39100 | 33100 | 33600 | 28500 | — |
| 2.0-3.0 | mm | 42200 | 33200 | 24200 | 33600 | 21600 | — |

The resulting average compressive strength (AVCS) was determined by combining data of tables 5 and 6 according to the procedure described before. It is found, that all pelleted acetylene blacks according to the present invention show significant lower values which is a prerequisite for high dispersibility in polymer compounds at low processing costs.

Compounding and Dispersion Testing of the Pelleted Acetylene Black

The pelleted acetylene blacks having a comparable structure (OAN) according to Comp. Ex. 1, Comp. Ex. 2, Ex. 1, Ex. 3 and Ex. 4 were tested.

The filter pressure tests or optical evaluation of film specimen can be used to determine the degree of carbon black dispersion in polymeric matrices. While the former is based on filtration of a colored polymer melt through a screen and measuring the resulting increase in pressure, the latter detects defects caused by non-dispersed carbon black agglomerates and aggregates (so-called specks) in a flat extruded film by transmission of light. The compounds for the dispersion testing were prepared as follows:

In a first step a premix of 35 weight percent acetylene black, 64.85 weight percent of a low density polyethylene (MFR 20) in powder form and 0.15 weight percent stabilizer (Irganox B 215, available from BASF SE) is produced in a tumble mixer with a mixing time of 10 minutes.

In a second step the premix is transferred to a laboratory kneader (PolyLab Q10, Rheomix available from Thermo Fischer Scientific, Karlsruhe, Germany) with banbury rotors and is mixed for 2 minutes at 200° C. and 60 RPM. While mixing the compound, both torque and mixing energy are recorded as function of time. Before further processing the compound, the mixture is taken out of the kneader chamber and pressed to plates which are hacked into small pieces that can be used for the pressure filter and film tests.

Filter Pressure Test:

With the obtained hacked granulates a pressure filter test according to DIN EN 13900-5 is performed using a single-screw extruder with general-purpose screw and melt-pump.
  Screw diameter: D=18 mm
  Screw length: L=20 D
  Compression ratio: 1:3
  Screen pack: 25 μm filter sieve from GKD—Gebr. Kufferath AG (Düren, Germany) with four layers
  Basic test polymer: PE-LD MFR 4
  Test temperature: 160° C.

In Table 7 the time until a pressure difference of 3 bar is obtained is reported. The longer time shows better dispersion quality.

Film Test:

For film testing according to DIN EN 13900-6 a single-screw extruder with a three-zone-general purpose screw and melt-pump was used:
  Screw diameter D=30 mm
  Screw length L=25 D
  Compression ratio: 1:4

The compound melt was extruded into a flat film using a flat film extrusion die with a height of 0.6 mm and a width of 220 mm. In front of the die, a Sulzer melt mixer SMB-H 17/6 (Sulzer LTD, Winterthur, Schweiz) is used for receiving a homogeneous film. The defect area was measured according to DIN EN 13900-6.

The obtained defect area and the mixing energy are given in table 7 below. The lower defect area shows better dispersion quality.

TABLE 7

Filter Pressure and Film Test Results plus Required Mixing Energy

| Sample | Time (ΔP = 3bar) | Defect Area | Mixing Energy/kJ |
|---|---|---|---|
| Comp. Ex. 1 | 1.5 min | 165 ppm | 32.9 |
| Ex. 1 | 2.4 min | 24 ppm | 28.7 |
| Ex. 3 | 12.6 min | 11 ppm | 24.7 |
| Ex. 4 | 4.2 min | 28 ppm | 28.5 |
| Ex. 4 (>1.4 mm) | 8.4 min | 17 ppm | 27.7 |
| Ex. 4 (<1.4 mm) | 3.0 min | 35 ppm | 29.8 |
| Comp. Ex. 2 | 2.7 min | 26 ppm | 34.4 |

It is evident from table 7 that the examples according to the present invention show a lower mixing energy compared to comparative examples 1 and 2. Examples 1 and 4 (all fractions) show that the reduced mixing energy can be achieved without compromising the dispersion quality, compared to the commercial Denka product.

Furthermore, it is evident from the size fraction greater 1.4 mm of example 4 when the average pellet size of the pelleted acetylene black is above 1.4 mm the mixing energy can be further reduced and the dispersion quality compared to the commercial product is further improved.

The invention claimed is:

1. A pelleted acetylene black having a mass strength measured according to ASTM D 1937-10 of 20 to 200 N at most and an average pellet size measured according to ASTM D 1511-10 of at least 1.0 mm.

2. The pelleted acetylene black according to claim 1, having an average pellet size measured according to ASTM D 1511-10 of 1.0 to 2.5 mm.

3. The pelleted acetylene black according to claim 1, having an average compressive strength of less than 65 kPa.

4. The pelleted acetylene black according to claim 1, having an average compressive strength of 15 to 60 kPa.

5. The pelleted acetylene black according to claim 1, wherein at least 40 wt.-% of the pellets have a size of at least 1.4 mm measured according to ASTM D 1511-10.

6. The pelleted acetylene black according to claim 1, wherein at least 35 wt.-% of the pellets have a size within the range of 1.4 mm to 2.0 mm measured according to ASTM D 1511-10.

7. The pelleted acetylene black according to claim 1, wherein at least 40 wt.-% of the pellets have a size within the range of 1.4 mm to 2.0 mm measured according to ASTM D 1511-10.

8. The pelleted acetylene black according to claim 1, having an iodine adsorption measured according to ASTM D 1510-11 of 50 to 150 mg/g.

9. The pelleted acetylene black according to claim 1, having an OAN absorption measured according to ASTM D 2414-09A of 140 to 320 ml/100 g.

10. The pelleted acetylene black according to claim 1, wherein the pellets do not have a core/shell morphology.

11. The pelleted acetylene black according to claim 1, wherein the pellets do not contain an organic binder.

12. A compound comprising a resin or polymer or rubber matrix and the acetylene black according to claim 1 in said matrix.

13. The compound according to claim 12, wherein the compound is a conductive compound.

14. An agent comprising the acetylene black according to claim 1, which agent is one of an electrically conductive agent or an antistatic agent.

15. A product comprising the agent of claim 14, the product being a battery, a capacitor, or an electrically conductive paper.

16. A process for the preparation of a compound containing a resin, a polymer, or rubber and the pelleted acetylene black of claim 1, comprising dispersing the pelleted acetylene black in the resin, polymer, or rubber.

17. A product comprising the acetylene black of claim 1, the product being a wire, a cable, a belt, a hose, a floor, a shoe, a roller, a heater, a bladder, or a paint.

18. A pelleted acetylene black having a mass strength measured according to ASTM D 1937-10 of 200 N at most and an average pellet size measured according to ASTM D 1511-10 of at least 1.0 mm, wherein the pelleted acetylene black has an average compressive strength of less than 65 kPa.

19. A pelleted acetylene black having a mass strength measured according to ASTM D 1937-10 of 200 N at most and an average pellet size measured according to ASTM D 1511-10 of at least 1.0 mm, wherein the pelleted acetylene black has at least 40 wt.-% of the pellets with a size of at least 1.4 mm measured according to ASTM D 1511-10.

* * * * *